United States Patent [19]

Liautaud

[11] 3,846,992

[45] Nov. 12, 1974

[54] SYSTEM OF CONNECTION OF A PIPELINE TO AN UNDERWATER PIPELINE AND A METHOD OF PUTTING IT INTO EFFECT

[75] Inventor: Jean A. Liautaud, Paris, France

[73] Assignee: Subsea Equipment Associates Limited, Hamilton, Bermuda

[22] Filed: Apr. 5, 1973

[21] Appl. No.: 348,417

[30] Foreign Application Priority Data
Apr. 11, 1972 France .............................. 72.12603

[52] U.S. Cl. .................................... 61/72.3, 166/.6
[51] Int. Cl. ............................................. F16l 1/00
[58] Field of Search ............... 61/72.1, 72.3; 166/.5, 166/.6; 285/18, 24

[56] References Cited
UNITED STATES PATENTS

| | | | |
|---|---|---|---|
| 3,503,219 | 3/1970 | Hovot | 61/72.3 |
| 3,591,204 | 7/1971 | Shipes | 166/.6 |
| 3,592,014 | 7/1971 | Brown | 61/72.1 |
| 3,604,731 | 9/1971 | Petersen | 166/.6 |
| 3,695,350 | 10/1972 | Petersen | 61/72.3 |
| 3,701,261 | 10/1972 | Nolan, Jr. | 61/72.3 |

*Primary Examiner*—Jacob Shapiro
*Attorney, Agent, or Firm*—Sughrue, Rothwell, Mion, Zinn & Macpeak

[57] ABSTRACT

A system for connecting an oil pipeline to an underwater system of piles consists of a baseplate anchored to the seabed with the aid of a drilling ship. The baseplate is provided with a pulley and a locking element. By means of a cable, an end of a frame bearing the first section of pipe to be connected to a conduit is displaced until it locks in the element. The frame also bears a guide structure. A tool bearing connectors coupled by a conduit is then lowered and introduced into the guide structures successively to obtain the desired connection.

9 Claims, 8 Drawing Figures

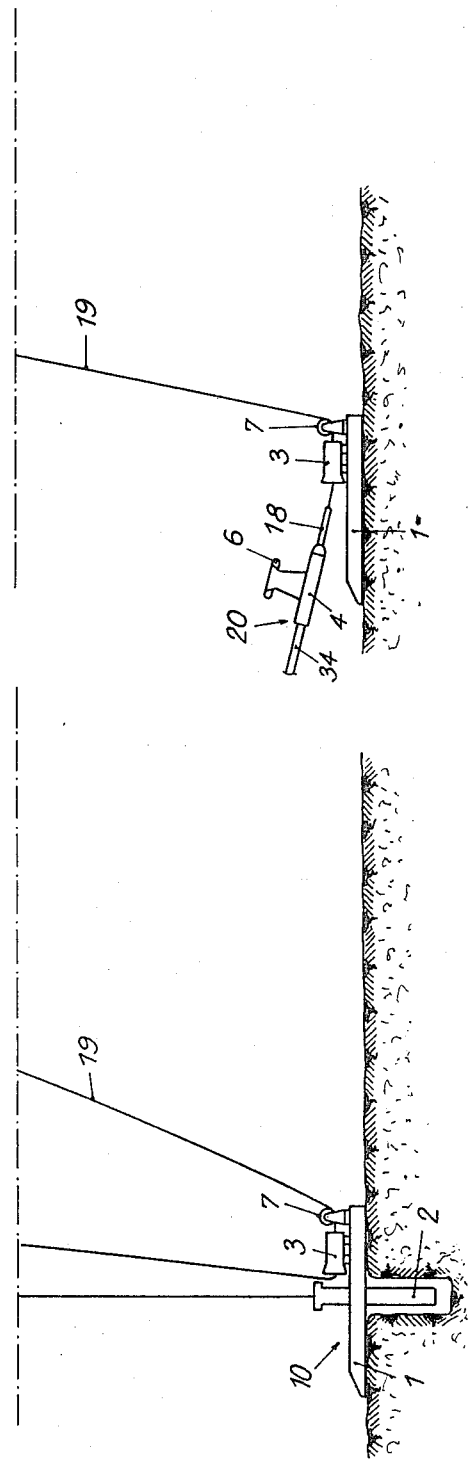

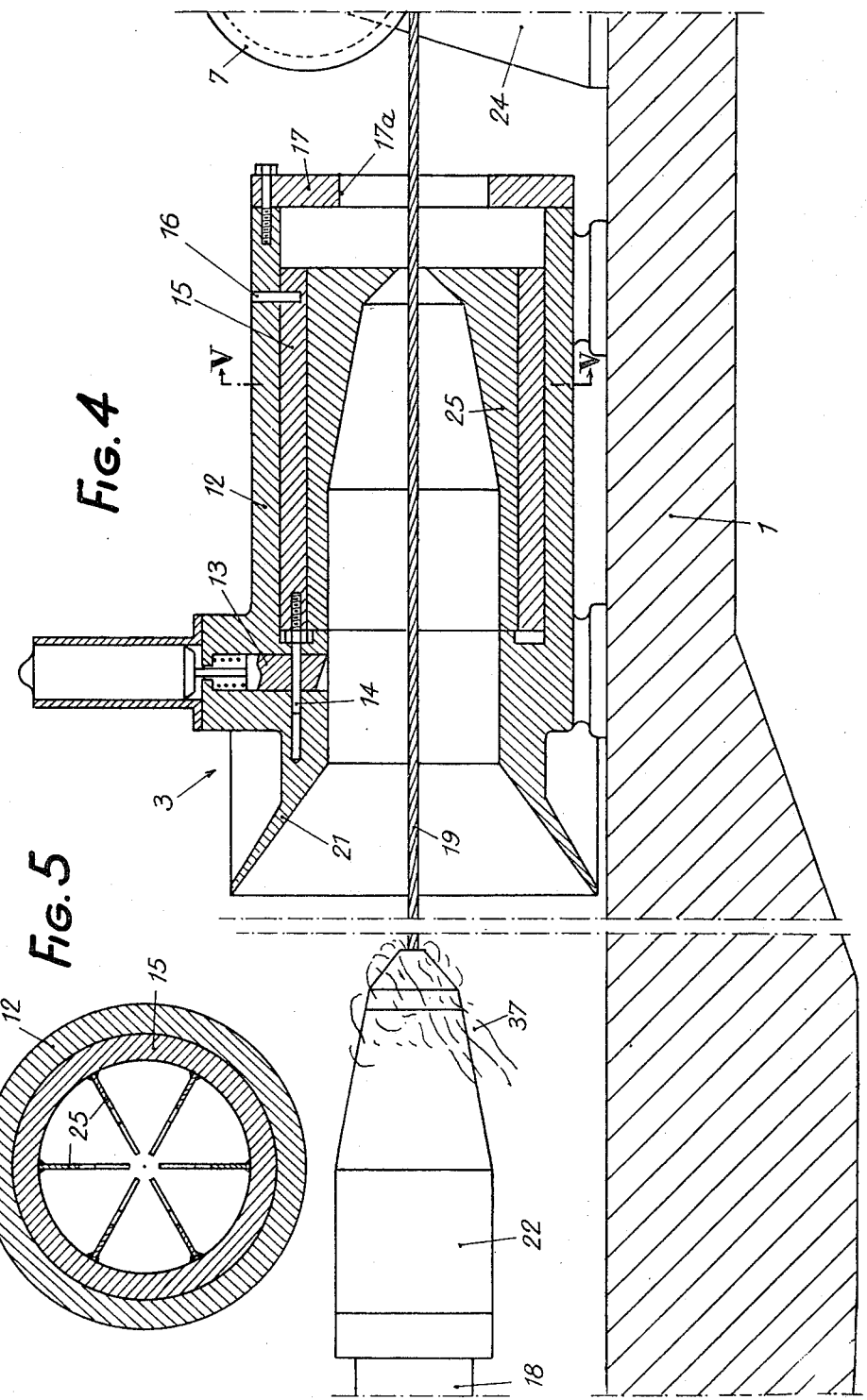

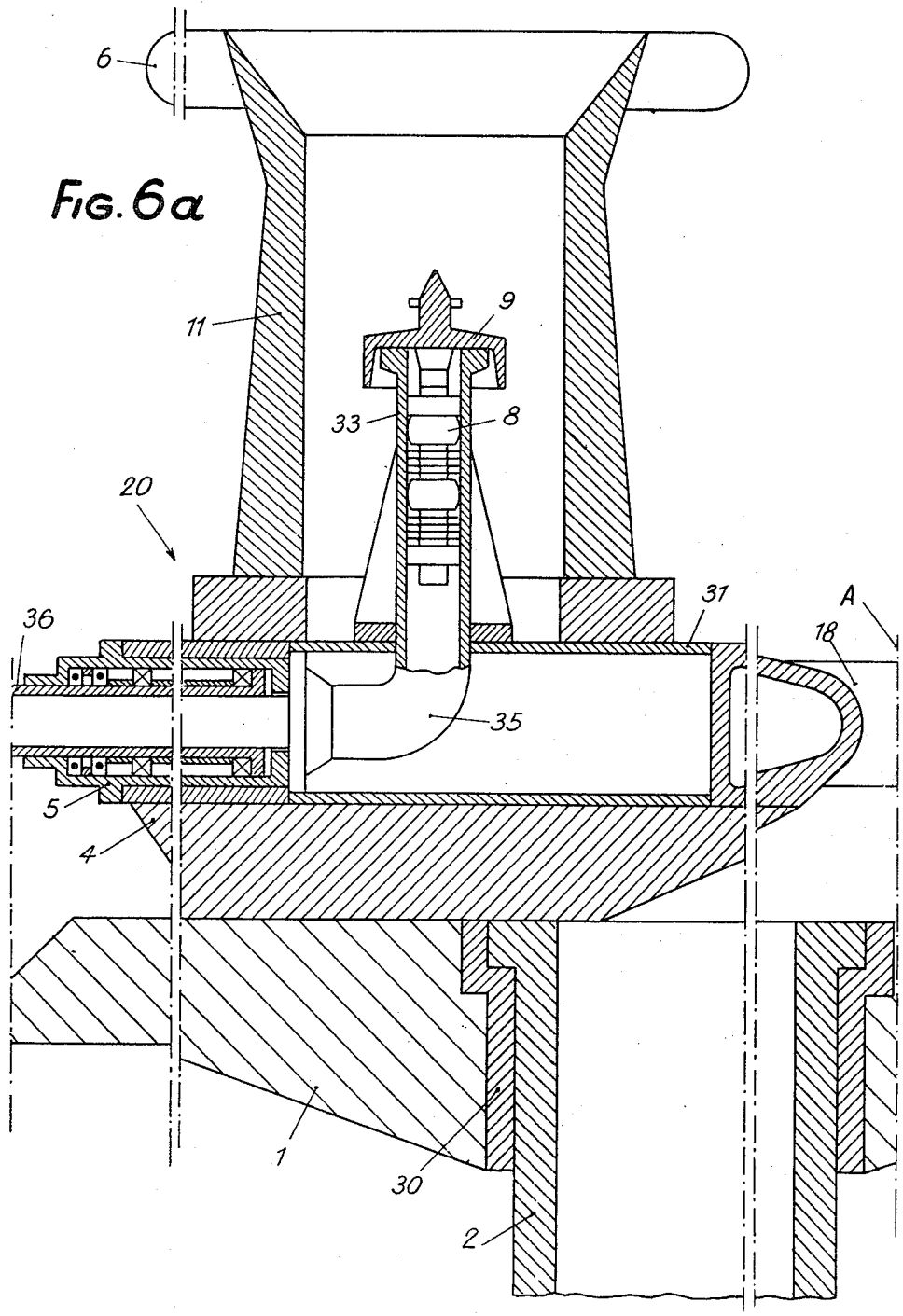

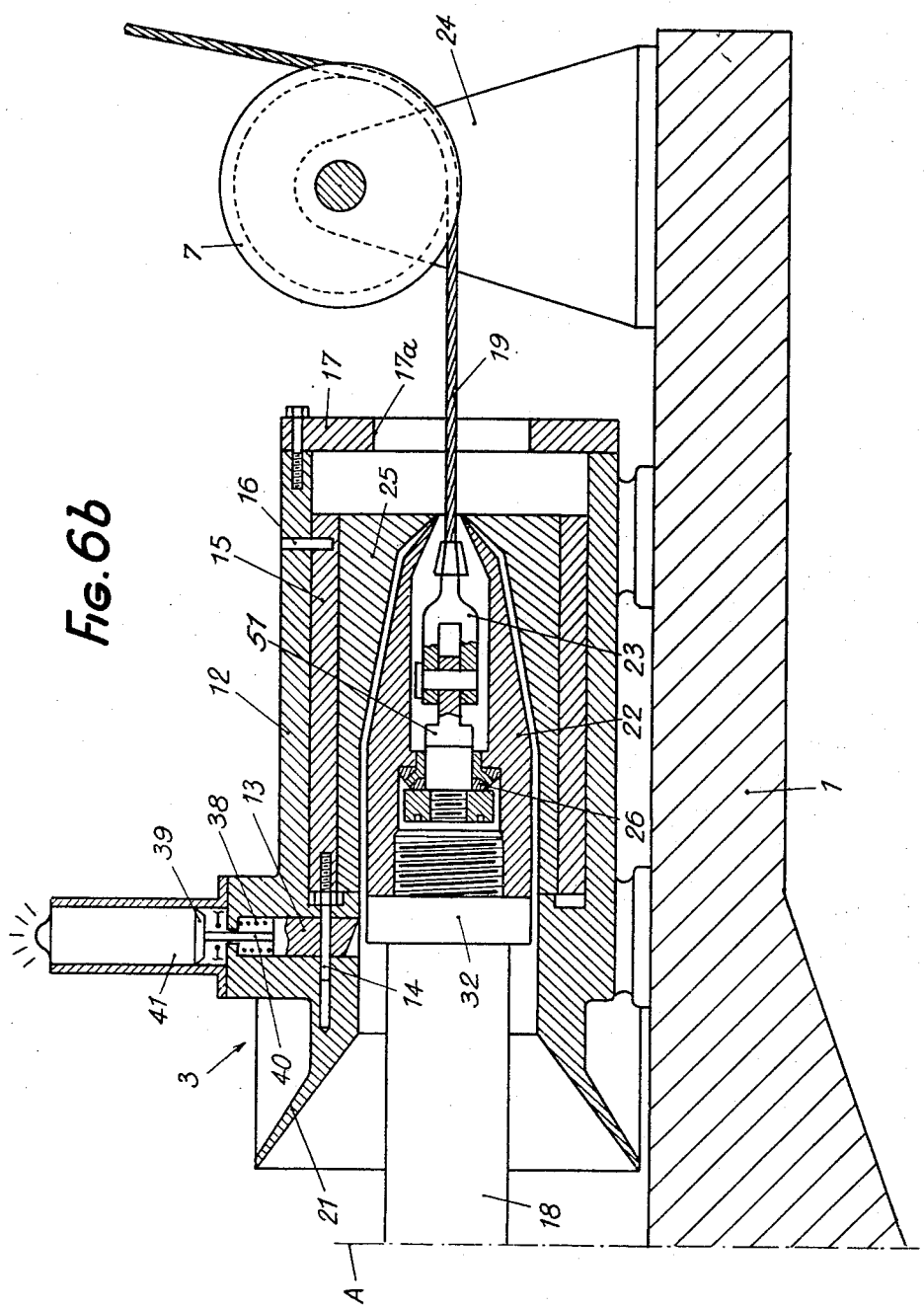

SYSTEM OF CONNECTION OF A PIPELINE TO AN UNDERWATER PIPELINE AND A METHOD OF PUTTING IT INTO EFFECT

The invention relates to a system of connection of a pipeline intended particularly to convey petroleum products from an underwater well to an underwater system of pipes. It concerns more particularly connection to a system of pipes already provided at its end with a vertical connection member surrounded with a guide structure so as to proceed with joining up of the pipeline to the said system of pipes by means of the method described in French patent application filed on the Apr. 10, 1972, under Pat. No. 72.12485 by the Applicant on: "A system of connection of two underwater pipelines and a method of putting it into effect." This application is the basis of commonly assigned U.s. application Ser. No. 347,513, filed Apr. 3, 1973.

Various methods are known to exist of connecting pipes to an underwater system of pipes; however, they all necessitate either the presence of a team of divers or the employment of complicated and onerous means.

The connection operation is the longer and more onerous the greater the depth where the connection is to be performed. The methods already proposed which employ complicated means do not yet offer sufficiently automatic operation and reliability.

The present invention provides a system for connection of an upwardly extending member of an underwater pipe system to a pipeline at the surface, comprising a connection frame provided with a locking head, and an anchored base member provided with a device for receiving and attaching the said locking head, the said frame further including a guide structure for surrounding the said upwardly extending member.

As the system is essentially composed of two portions between which the only connection required is the insertion of the locking head of the frame simply resting on the baseplate into the reception and attachment device on the baseplate, it is clear that it is sufficient to provide at the time of lowering the baseplate a draw cable judiciously guided, of which one end is connected to the locking head of the frame to bring the latter into the locking position on the baseplate.

Thus the system advocated enables its implementation with great simplicity and great reliability whatever the depth of the connection since, once the frame is resting on the plate and attached by its locking system, it becomes possible to connect the vertical members of the underwater system of pipes and the first section of the pipeline by means of the system of connection by automatically locking connector described in the aforesaid patent application.

Another object of the invention is to be able to maintain the reliability of the device whatever the underwater zone encountered in the course of lowering the frame and particularly in spite of seaweed which may get caught up on the locking head of the frame. For this purpose the reception and attachment device is provided with separate knives arranged in a crown of such a kind that the simple introduction of the locking head into the reception device brings about the rejection of the seaweed or other rubbish out of the end of the head and between the knives enabling the complete introduction of the head in order to lock it.

Another object of the invention is a system of this type, simple and rapid in execution, characterised in that a float is attached to the guide core of the structure surrounding the vertical member of the end of the first section of line to be connected and carried by the frame, the said float keeping the said frame in the mating position on the baseplate. Thus the placing of the frame is facilitated while increasing further the reliability of the operation.

Other features and advantages will be apparent from the following description made with reference to the attached drawings which show by way of nonrestrictive example a preferred embodiment of the devices incorporated into the connection system:

In the drawings:

FIG. 2 shows a diagrammatic view of the operation of placing the baseplate from the surface;

FIG. 3 shows a diagrammatic view of the operation of placing on the baseplate the connection frame at the end of the first section;

FIG. 4 illustrates a section of the device for attaching the locking head of the frame;

FIG. 5 shows a section along V—V in FIG. 4;

FIG. 6a shows a partial section of the frame;

FIG. 6b shows a section of the frame and the plate joining up with FIG. 6a along the line A.

Figure 1:
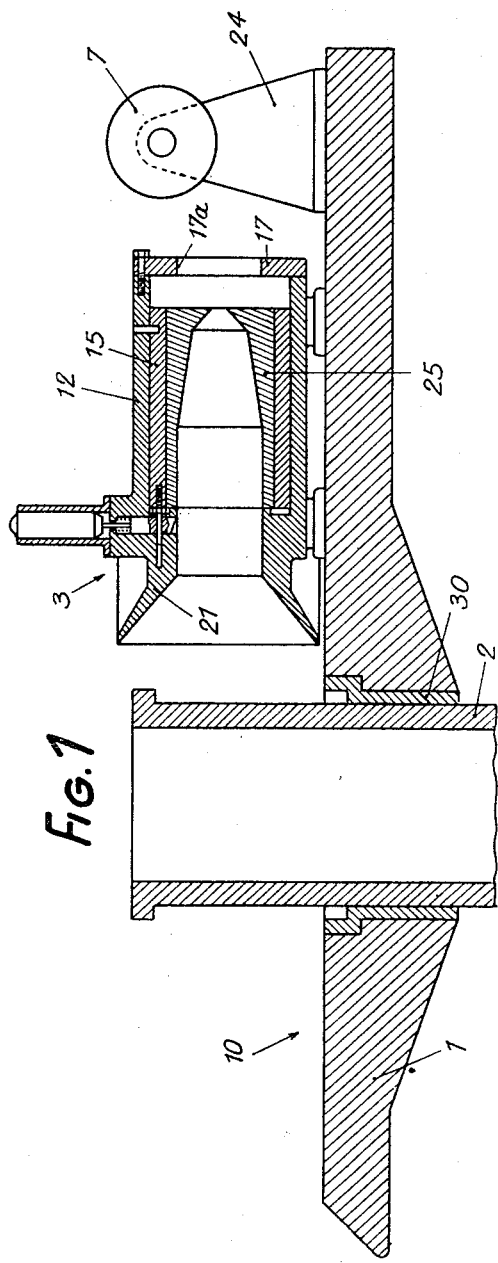
FIG. 1 shows a diagrammatic view in section of the baseplate of the connection system in course of being anchored.

In the diagrammatic representation in section in FIG. 1, 10 designates the assembly of the baseplate 1 and members which are integral with it; on the one hand the reception and attachment device 3 for the locking head 22 (see FIG. 6b) connected by the shaft 18 to the connection frame 20 as in FIG. 3, on the other hand the pulley 7 mounted on its supports 24. These two members are integral with the baseplate 1. The baseplate 1 is kept anchored on the bottom by the pile 2 which has been shown in a halfway position to bring to mind the way of placing the assembly 10. Once driven in, the pile is cemented at 30.

The reception and attachment device 3 is provided with a guide cone 21, a housing 12 containing a sleeve 15 bearing knives 25 of profile identical to that of the locking head 22, more easily seen in FIGS. 4 and 5, the housing ending in a stop-plate 17 provided with an opening 17a.

During the placing of the baseplate assembly 10, a cable 19 is employed one end of which is connected to a winch 27 on a surface vessel 28. The other end passes round the pulley 7, then through the device 3, and is wound onto the winch 29 of a drilling ship 50. The operation of anchoring a pile 2, arranged in an opening in a baseplate 1, being a known operation, it is unnecessary to described in detail the various phases of the drilling and cementing.

As soon as this operation has been carried out, a shackle 23, FIG. 6b, is attached to the end of the cable 19 connected to the drilling ship 50 or any other vessel capable of assembling sections of pipe, and connected to a ring 51 on the locking head 22 mounted on the shaft 18 forming part of the assembly of the connection frame 20, FIG. 3. This assembly constitutes the end of the first section of the pipeline assembled on the drilling ship 50.

The assembly of the connection frame 20 comprises in addition to the head 22 in FIG. 6b, mounted at the end of the shaft 18, a housing 31 attached to a frame 4, FIG. 6a. The ring 51 attached to the shackle 23 is integral with a thrust bearing 26 of the locking head 22 the back end of which forms a shoulder 32, relative to the shaft 18.

Above the housing 31 is a guide and mating structure 11 surrounding a vertical connection member 33 forming the end of the first section of pipe 34 (shown in FIGS. 3 and 7) to which it is connected by an elbow 35 and a swivel joint composed of the co-operating parts 5 and 36. The member 33 can be blocked by a packer 8 as well as by a cap 9. A float 6 is mounted on the upper portion of the guide and mating structure 11.

In order to prevent maloperation of the reception and attachment device 3 when the locking head 22 has been covered with seaweed or other marine dirt 37, FIG. 4, in the course of its passage, this device is designed to operate in two stages. For this purpose, the sleeve 15 is attached to the housing 12 by a shearpin 16. During a first stage in which the cable 19 draws the locking head 22 into the guide cone 21, the seaweed 37 is caught or torn by the knives 25, FIG. 5, against which the body of the locking head 22 seats. In proportion with the tension in cable 19, rubbish not yet stripped off by the knives is forced, then compressed, into the spaces separating the knives so that the locking head 22 finally seats itself entirely within the seating bounded by the profiles of the knives 25. The shearpin 16 then shears under the continuing effect of the force exerted by the cable 19 when the head rests entirely against the knives. During a second stage the sleeve 15, containing the locking head 22, as shown in 6b and no longer being retained by the shearpin 16, moves to the right. It moves a keeperpin 14 serving to keep a latch 13 out of the path of the locking head 22, but at the end of its travel along sleeve 15, the tip of the keeperpin 14 leaves the latch 13. The latter, under pressure from the spring 38, drops behind the shoulder 32 on the locking head 22 so that the locking head 22 remains trapped in the reception and attachment device 3.

Although the instant of shearing of the shearpin 16 can be detected by the pull exerted on the cable 19, the locking is signalled by the emission of signals resulting from the closure of a contact shown diagrammatically at 39, this closing being obtained by the downwards movement of the rod 40 induced by the expansion of the spring 38. The contact 39 can in fact operate any signalling device required as shown schematically at 41.

Figure 7:
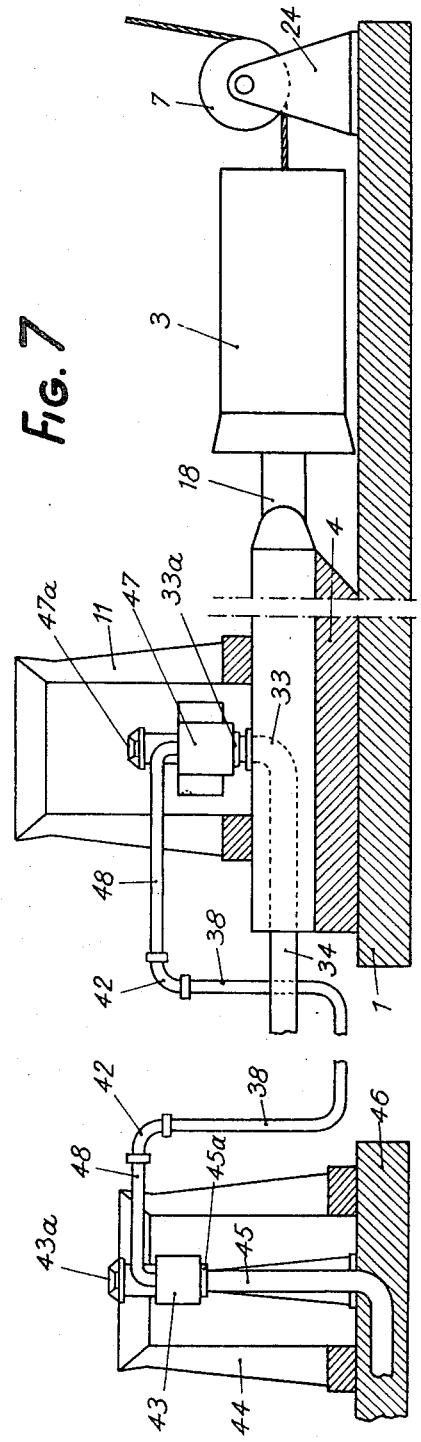
FIG. 7 shows a diagrammatic representation of the connection system.

As soon as locking of the locking head 22 of the connection frame 20 onto the assembly 10 of the baseplate has been signalled, it becomes possible by simple employment of a train of rods to withdraw the packer 8 which may be plugging the vertical connection member 33, then to proceed with the connection of this pipe with a corresponding member 45, FIG. 7, already installed at the seabed, by means of a system similar to that described in the aforesaid patent application. The guide and mating structure 11 as well as the guide structure 44 of the pipe 45 already installed on a base 46 containing for this purpose the abutments and bosses required for the operation of the automatic locking of the two automatic locking connectors 43 and 47 connected by a flexible pipe 48 equipped with swivel joints 42. Each connection is provided with a locking operating part 43a or 47a movable longitudinally so that the simple lowering of an automatic locking connector 43 or 47 inside the guide structure 44 or 11 brings about the connection and the automatic locking of the connector onto the mating flange 45a or 33a on the corresponding pipe 45 or vertical connection member 33. The connectors 43 and 47 being connected at the instant of their lowering by the flexible pipe 48, it is clearly sufficient to employ a device as described in the aforesaid patent application in order to effect connection of the vertical connection member 33 to the vertical pipe 45 in one operation necessitating only a single lowering of the above-mentioned device carrying the two automatic locking connection connectors 43 and 47.

It goes without saying that numerous variants could be recited of the system which has first been described and that the idler pulley could be replaced by other guide means or even be omitted. The guide means could also be attached either directly to the baseplate or directly to the reception and locking device.

What we claim is:

1. Apparatus for connecting an upwardly extending member of an underwater pipe system to the surface, said apparatus comprising:
   1. a baseplate adapted to be anchored on the bottom of a body of water;
   2. a reception and attachment device integrally connected to said baseplate, said reception and attachment device being shaped to engage a locking head to be recited;
   3. a connection frame, the lower surface of which is shaped to conform to the upper surface of said baseplate;
   4. a locking head mounted on said connection frame, said locking head being shaped to engage said reception and attachment device and to orient said connection frame with respect to said baseplate;
   5. a guide and mating structure mounted on said connection frame, said guide and mating structure being shaped to surround an upwardly extending member of an underwater pipe system; and
   6. means for bringing said locking head into engagement with said reception and attachment device, thereby fixing said connection frame on the upper surface of said baseplate.

2. Apparatus as claimed in claim 1 wherein said reception and attachment device has:
   1. a cavity therein shaped to receive said locking head;
   2. a guide cone surrounding the entrance to the cavity, and;
   3. an opening in the bottom of the cavity, whereby said locking head can be drawn into the cavity by means of a cable attached to the end of said locking head and passed through the opening in the bottom of the cavity in said reception and attachment device.

3. Apparatus as claimed in claim 2 and further comprising a shaft connecting said connection frame to said locking head, the end of said locking head adjacent to said shaft forming a shoulder relative to said shaft.

4. Apparatus as claimed in claim 3 wherein said reception and attachment device comprises:
   1. a housing;
   2. a sleeve slidably mounted within said housing;

3. a plurality of knives fixedly mounted within said sleeve, said knives having profiles identical to that of said locking head, said plurality of knives and said sleeve together defining the cavity in said reception and attachment device;
4. a shearpin attaching said sleeve to said housing in a first position in which the bottom of said sleeve is spaced from the bottom of said housing;
5. a latch slidably mounted in said housing a distance from the bottom thereof slightly in excess of the length of said locking head and in an orientation generally perpendicular to the cavity in said reception and attachment device; and
6. a keeperpin preventing said latch from extending into the cavity in said reception an attachment device when said sleeve is in its first position with respect to said housing, but not preventing said latch from extending into the cavity when the bottom of said sleeve rests against the bottom of said housing, whereby, when said locking head is drawn into the cavity in said reception and attachment device during use:
any seaweed or other marine dirt which may have come to cover said locking head during its passage from the surface will first be torn off by said knives or forced into the spaces separating said knives, then
when said locking head has seated itself against said knives, said shearpin will shear, said sleeve will move from its first position to a position in which its bottom rests against the bottom of said housing, and said latch will engage the shoulder formed between said locking head and said shaft, thereby trapping said locking head in said reception and attachment device.

5. Apparatus as claimed in claim 2 wherein said reception and attachment device has:
1. a cavity therein adapted to receive said locking head, and
2. a plurality of knives extending into the cavity, said knives having a profile identical to that of said locking head, whereby, when said locking head is brought into engagement with said reception and attachment device during use, any seaweed or other marine dirt which may have come to cover said locking head during its passage from the surface will first be torn off by said knives or forced into the spaces separating said knives.

6. Apparatus as claimed in claim 5 wherein said reception and attachment device comprises:
1. a housing;
2. a sleeve slidably mounted within said housing, said plurality of knives being mounted in said sleeve;
3. a shearpin attaching said sleeve to said housing in a first position in which the bottom of said sleeve is spaced from the bottom of said housing; and
4. means for trapping said locking head in the cavity in said reception and attachment device when the bottom of said sleeve rests against the bottom of said housing, whereby, when said locking head has seated itself against said knives, said shearpin will shear, said sleeve will move from its first position to a position in which its bottom rests against the bottom of said housing, and said locking head will be trapped in said reception and attachment device.

7. Apparatus as claimed in claim 6 and further comprising means for emitting signals indicating that said shearpin has been sheared.

8. Apparatus as claimed in claim 1 wherein
said means for bringing said locking head into engagement with said reception and attachment device comprise a pully mounted on said baseplate and means for attaching a cable to said locking head and said reception and attachment device has an opening therein through which a cable may be passed,
whereby said locking head can be drawn into engagement with said reception and attachment device by means of a cable attached to said locking head, passed through the opening in said reception and attachment device, and then passed around said pulley.

9. A method for connecting an upwardly extending member of an underwater pipe system to the surface, said method comprising the steps of:
a. passing a cable through a reception and attachment device mounted on a base member before the reception and attachment device and the base member are lowered into a body of water;
b. attaching a first end of the cable to a first surface vessel;
c. attaching the second end of the cable to a winch mounted on a second surface vessel;
d. lowering the base member to the bottom of the body of water;
e. attaching the base member to the bottom of the body of water;
f. detaching the first end of the cable from the first surface vessel;
g. attaching the first end of the cable to a locking head mounted on a connection frame;
h. lowering the connection frame to the bottom of the body of water while pulling on the cable by means of the winch on the second surface vessel, thereby guiding the locking head into the reception and attachment device on the base member; and
i. joining the connection frame to an upwardly extending member of an underwater pipe system.

* * * * *

UNITED STATES PATENT OFFICE
CERTIFICATE OF CORRECTION

Patent No. 3,846,992    Dated November 12, 1974

Inventor(s) Jean A. LIAUTAUD

It is certified that error appears in the above-identified patent and that said Letters Patent are hereby corrected as shown below:

IN THE CLAIMS:

Claim 5, Line 1, delete "2" and insert --1--.

Signed and sealed this 15th day of April 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

PATENT NO. : 3,846,992
DATED : November 12, 1974
INVENTOR(S) : Jean A. LIAUTAUD

It is certified that error appears in the above-identified patent and that said Letters Patent are hereby corrected as shown below:

IN THE SPECIFICATION:

Col. 3, Line 57, delete "pipe" and insert --member--.

Col. 3, Line 58, delete "member" and insert --pipe--.

Signed and Sealed this twenty-fifth Day of May 1976

[SEAL]

Attest:

RUTH C. MASON
Attesting Officer

C. MARSHALL DANN
Commissioner of Patents and Trademarks